(12) United States Patent
Neal

(10) Patent No.: US 6,418,744 B1
(45) Date of Patent: Jul. 16, 2002

(54) METHOD AND APPARATUS FOR CONTAINING AN AMBIENT CLIMATE CONTROL SYSTEM

(76) Inventor: Earnest J. Neal, 1 Cosair Dr., Chamblee, GA (US) 30341

( * ) Notice: Subject to any disclaimer, the term of this patent is extended or adjusted under 35 U.S.C. 154(b) by 0 days.

(21) Appl. No.: 09/829,166

(22) Filed: Apr. 9, 2001

(51) Int. Cl.[7] .......................... F25D 21/14; F25D 19/00; F25D 17/06; B60H 1/32
(52) U.S. Cl. ............................ 62/285; 62/239; 62/298; 62/419
(58) Field of Search ................................ 34/433; 62/89, 62/100, 129, 150, 173, 188, 237; 122/390; 165/42, 43, 45, 134.1; 188/1.12, 134; 244/118.5; 280/33.996; 285/179; 312/334.18; 454/119, 171

(56) References Cited

U.S. PATENT DOCUMENTS

| | | | |
|---|---|---|---|
| 2,251,960 A | * 8/1941 | Smith | 312/334.18 |
| 2,303,867 A | * 12/1942 | Stebbins | 34/433 |
| 2,538,382 A | * 1/1951 | Reilly | 454/119 |
| 2,694,537 A | * 11/1954 | Reichert | 244/118.5 |
| 2,738,201 A | * 3/1956 | Spears | 280/33.996 |
| 2,778,206 A | * 1/1957 | Wilson et al. | 62/237 |
| 3,360,954 A | * 1/1968 | Snider et al. | 165/45 |
| 3,604,217 A | * 9/1971 | Spear | 62/100 |
| 3,623,575 A | * 11/1971 | Joseph et al. | 188/134 |
| 3,635,046 A | * 1/1972 | Sato et al. | 62/173 |
| 3,777,506 A | 12/1973 | Hergatt | |
| 3,859,816 A | * 1/1975 | McDonald et al. | 454/171 |
| 4,437,320 A | 3/1984 | Eklund | |
| 4,450,900 A | * 5/1984 | Nathan | 165/42 |
| 4,632,019 A | * 12/1986 | Whiteman | 454/119 |
| 4,835,977 A | * 6/1989 | Haglund et al. | 62/89 |
| 4,888,958 A | * 12/1989 | Ella | 285/179 |
| 5,031,690 A | * 7/1991 | Anderson et al. | 165/43 |
| 5,056,331 A | 10/1991 | Lotz | |
| 5,099,652 A | * 3/1992 | Iida et al. | 62/129 |
| 5,383,335 A | * 1/1995 | Anderson et al. | 62/237 |
| 5,638,695 A | * 6/1997 | Kamio et al. | 165/134.1 |
| 5,881,846 A | * 3/1999 | French et al. | 188/1.12 |
| 6,065,296 A | * 5/2000 | Feger | 62/150 |
| 6,167,714 B1 | * 1/2001 | Baffes | 62/188 |
| 6,167,741 B1 | 1/2001 | Baffes | |
| 6,279,333 B1 | * 8/2001 | Cilli et al. | 122/390 |

* cited by examiner

Primary Examiner—William C. Doerrler
Assistant Examiner—Filip Zec
(74) Attorney, Agent, or Firm—Richard C. McComas; Patent Focus, Inc.

(57) ABSTRACT

A mobile apparatus containing means for ambient climate control is a structural frame apparatus or housing frame mounted onto a mobile platform. The mobile platform has mounted thereon a power source for providing power to means for ambient climate control. A condensation vessel is provided to receive the condensation generated by means for ambient climate control during operation thereof. An air duct may, if desired, be installed on means for ambient climate control to extend the climate control range. A substantially rectangular air duct adapter is provided to adapt a plurality of different sized air ducts to means for ambient climate control.

10 Claims, 3 Drawing Sheets

METHOD AND APPARATUS FOR CONTAINING AN AMBIENT CLIMATE CONTROL SYSTEM

FIELD OF THE INVENTION

The invention relates, in general, to an apparatus for providing mobile ambient climate control. In particular, the invention relates to an apparatus having mounted thereon an electrical power source, condensation vessel, and means for ambient climate control. More particularly the invention relates to a structural housing frame having mounted therein means for ambient climate control powered by the power source and means for retaining the condensation vessel.

BACKGROUND OF THE INVENTION

Providing for employees comfort and safety while they are engaged in work projects is of great concern to employers. While workers may be productive and enjoy their work, comfortable surroundings improve their productivity and increases enjoyment while at work. Over the years, employers have attempted various methods to control the ambient workplace environment by modifying the air through dehumidifying, humidifying, heating, and cooling the ambient air. Ambient climate control is a great benefit to the rank and file members of the work force. With the advent of workplace ambient climate control productivity increased and employee job satisfaction increased.

Workplace climate control functions well in a closed system and in a defined space i.e. ambient workplace. For example, office ambient air conditioning is generally a closed system i.e., cooled, heated, or dehumidified ambient air is circulated about a closed space and returns to the ambient air conditioner wherein the ambient air conditioner re-heats or re-cools the previously heated or cooled ambient air. Fresh air may be introduced into a closed ambient air conditioning system but fresh air reduces the efficiency of the ambient air conditioner. Once ambient air is cooled in a closed ambient air conditioning system, the water content is reduced. For example, if the ambient air is very humid, partially removing the water content reduces the humidity; therefore, the workplace environment is more conducive to high productivity. The converse is also true. If the ambient air is very dry, adding water to the air will increase the humidity and make the workplace environment more conducive to high productivity.

If the workplace is not in a closed environment, re-circulating the ambient air back through the air conditioner is impossible. The air conditioner will continuously intake fresh air, i.e., the water content of the ambient air will be an important factor in cooling the open workplace. An example of an open workspace is the interior of a small aircraft.

Generally, small aircraft do not have ambient air conditioning that is operable while the aircraft is parked or in a stationary position on an airport runway or tarmac. While the small aircraft is serviced or detailed on the tarmac, air conditioning may be supplied externally, i.e., a vehicle containing an air conditioner is positioned as close as possible to the aircraft and an air conditioning duct is positioned from the air conditioner to the interior of the aircraft i.e., an ambient environment or workspace.

Attempts in the past to provide the interior of an aircraft with climate control have produced vehicle mounted climate control systems that must be positioned a considerable distance from the aircraft for safety reasons i.e., contact damage due to collision with the aircraft. If the vehicle mounted climate control system is positioned a considerable distance from the aircraft the climate control's air duct must travel the extended distance to the interior of the aircraft. For this reason the vehicle-mounted climate control system must produce a greater volume of conditioned air to traverse the extended distance. The increased volume of conditioned air also increases the volume of water generated by the climate control system during operation. Generally, the large volume of water is dumped onto the tarmac and evaporates into air. The large amount of water dumped onto the tarmac is a safety issue as well as an environmental issue.

It would be desirable to have a mobile climate control system that would heat and cool an unenclosed workplace. The mobile climate control system would be sufficiently sized to be positioned close to the workspace thereby having a relatively foreshortened attachable air conditioning duct. The mobile climate control system would be safe and environmentally friendly by retaining the condensation generated by the climate control system for later proper disposal.

SUMMARY OF THE INVENTION

The present invention is a structural frame apparatus or housing frame mounted onto a mobile platform. The housing frame has a beveled platform mounted therein. The housing frame in concert with the beveled platform form a structural enclosure. The structural enclosure is sized to receive means for ambient climate control. Power is provided to means for ambient climate control via an electric power utility company, a power generator or any other convenient electrical power sources. The power generator may, if desired, be an electric or gasoline type generator producing electrical power for means for ambient climate control. A condensation vessel is provided to receive the condensation generated by means for ambient climate control during operation thereof. An air duct may, if desired, be adaptively mounted on means for ambient climate control to extend the cooling or heating range of means for ambient climate control.

The mobile platform, having disposed thereon the housing frame containing means for ambient climate control with power being provided by the power generator and the retained condensation vessel, enables mobility of ambient climate control and containment of generated condensation. When taken in conjunction with the accompanying drawings and the appended claims, the features and advantages of the present invention become apparent upon reading the following detailed description of the embodiments of the invention.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
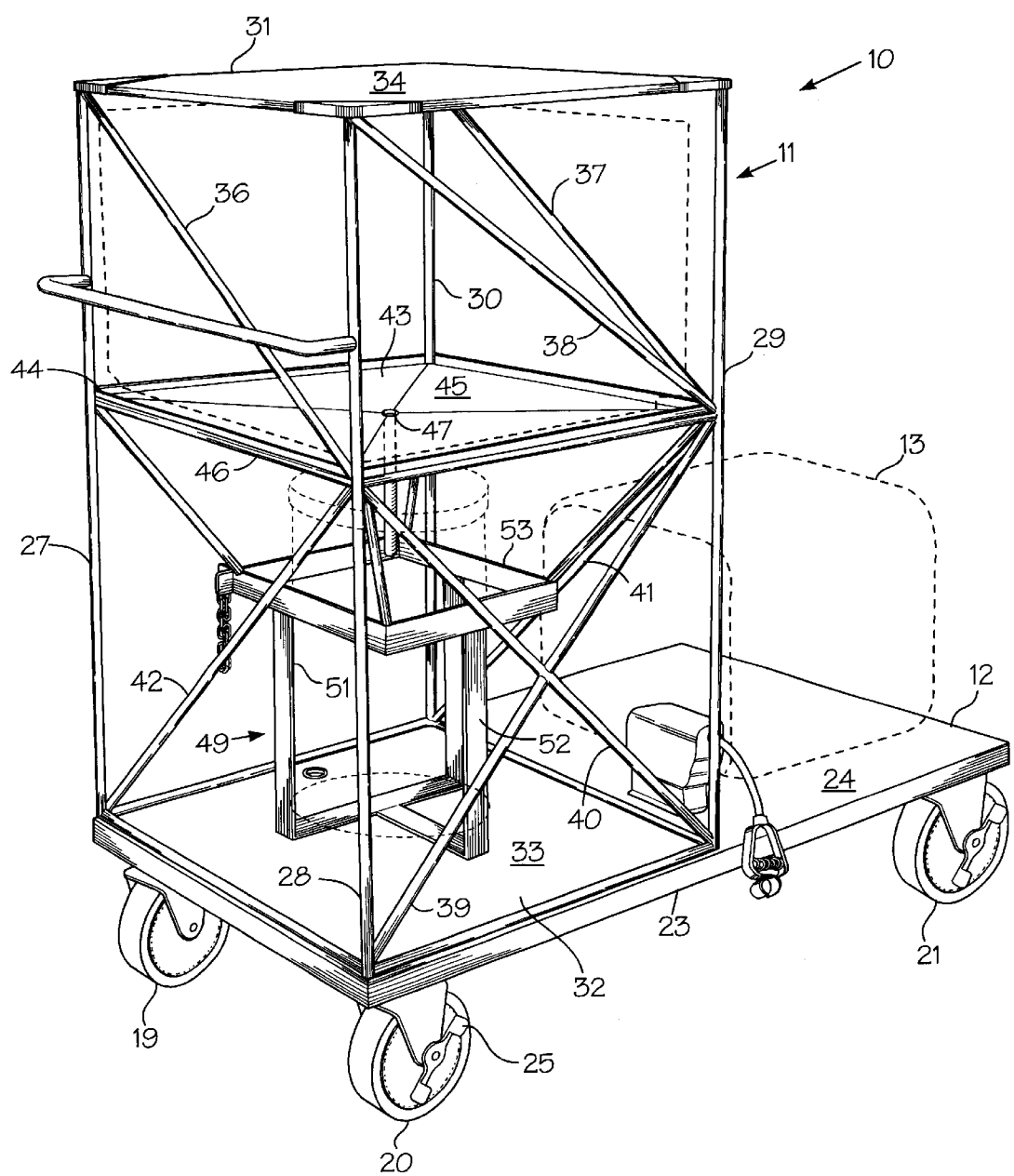
FIG. 1 illustrates a perspective view schematic diagram of the present invention.

Before describing in detail the particular improved ambient climate control system in accordance with the present invention, it should be observed that the invention resides primarily in a novel structural combination of conventional ambient climate control, power generating, discrete structural subsystems or structural subassembly components, associated control of the aforementioned ambient climate control equipment and components, and not in the particular detailed configuration thereof. Accordingly, the structure, command, control, and arrangement of these conventional components and subassemblies have, for the most part, been illustrated in the drawings by readily understandable diagram representations and schematic diagrams. The drawings show only those specific details that are pertinent to the present invention in order not to obscure the disclosure with structural details which will be readily apparent to those skilled in the art having the benefit of the description herein. For example, means for ambient climate control unit 14, FIG. 3 has numerous connections to the present invention 10. The connections to the present invention 10 have been simplified in order to emphasize those portions that are most pertinent to the invention. Thus, the top level system diagram and schematic diagram illustrations of the Figures do not necessarily represent the mechanical structural arrangement of the exemplary system, and are primarily intended to illustrate major hardware structural components of the system in a convenient functional grouping whereby the present invention may be more readily understood.

An overview of the preferred embodiment of the present invention: The present invention 10, FIG. 1 is a structural frame apparatus or housing frame mounted onto a mobile platform 12. Power is provided to means for climate control unit 14 via a power generator 13. The power source may, if desired, be an electric power utility, an electrical power converter, or an electric or gasoline type generator. Means for ambient climate control unit 14 is defined to be any convenient heating, cooling, humidifying, or dehumidifying apparatus. A condensation vessel 15 is provided to receive the condensation generated by means for ambient climate control unit 14 during operation thereof. An air duct 16 may, if desired, be installed on means for ambient climate control unit 14 to extend the climate conditioning range of means for ambient climate control unit 14. A substantially rectangular air duct adapter 17 is provided to adapt a plurality of different sized air ducts 16 to means for ambient climate control unit 14.

The mobile platform 12, FIG. 1 having disposed thereon the housing frame 11 containing means for ambient air conditioning with power provided by the power generator 13, and the condensation vessel's 15 retaining member 18 retains the condensation vessel 15 thereby providing mobile ambient air conditioning and containment of condensation generated from the means for ambient air-conditioning unit 14.

Structural components of the present invention 10: The mobile platform 12, FIG. 1 may, if desired, be any selected type of geometry i.e., square, oval, triangular, or any type of polygon. The mobile platform 12 of the present invention 10 is a substantially rectangular platform. The mobile platform 12 is fabricated from a substantially rigid material and is of sufficient thickness to support the weight of the present invention 10. The mobile platform 12 has a top surface 24 and a bottom surface 23. The top and bottom surfaces 24 and 23 respectively may, if desired, be smooth, textured, or corrugated to enable or assist the positioning of the present invention 10. The mobile platform 12 has four ground engaging wheels 19, 20, 21, and 22. The ground engaging wheels 19, 20, 21, and 22 may, if desired, be positioned at any convenient point of the mobile platform's bottom surface 23. The ground engaging wheels 19, 20, 21, and 22 may, if desired, have a locking mechanism 25 installed on each wheel to provide locking its associated wheel in-place. A steering and movement control mechanism 26 is mounted in a perpendicular relationship at one end of the mobile platform 12. The steering and movement control mechanism 26 is substantially rectangular. The steering and movement control mechanism 26 has one end mounted to the mobile platform 12 and the other end 35 is curved outward.

A hollow tubular-like frame may be used to form the housing frame 11, FIG. 1. The housing frame 11 may, if desired, be fabricated from solid tube construction. The housing frame 11 is substantially elongated and rectangular. The housing frame 11 has four elongated tubular frame sidewalls 27, 28, 29, and 30 and two foreshortened tubular frame endwalls 31 and 32 comprising the frame walls of the housing frame 11 structure. The elongated tubular frame sidewalls 27, 28, 29, and 30 are positioned in an opposing and parallel arrangement. The elongated tubular frame sidewalls 27, 28, 29, and 30 are joined along their respective elongated edges to the adjoining sidewalls, thereby forming the rectangular shape of the housing frame 11. The two foreshortened tubular endwalls 31 and 32 are oppositely spaced apart, parallel, and connected to each end of the elongated tubular sidewalls. If desired platforms 33 and 34 may be connected to the two foreshortened tubular endwalls 31 and 32. The edges of platforms 33 and 34 are connected to their respective adjoining sidewalls 27, 28, 29, and 30. The housing frame 11 has a plurality of supporting cross frames 36, 37, 38, 39, 40, 41, and 42. The supporting cross frames 36, 37, 38, 39, 40, 41, and 42 are connected to the elongated tubular frame sidewalls 27, 28, 29, and 30. The supporting cross frames 36, 37, 38, 39, 40, 41, and 42 provide the lateral structural support for the housing frame 11.

Figure 2:
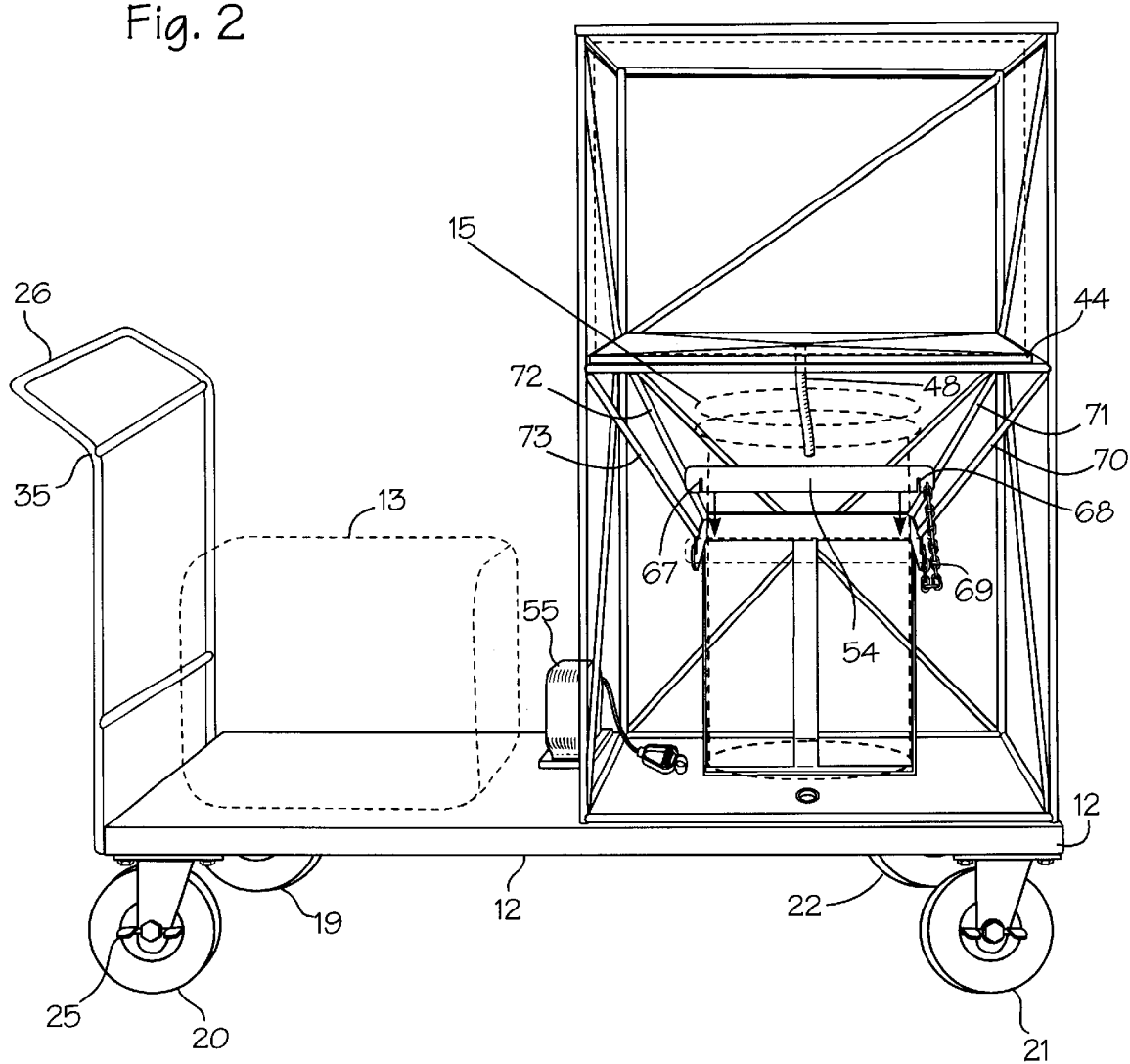
FIG. 2 illustrates a side view schematic diagram of the present invention of FIG. 1.

A substantially rectangularly shaped beveled platform 43, FIG. 1 is spaced between foreshortened tubular endwalls 31 and 32. A continuous lip 44 extends about the beveled platform's 43 perimeter. The continuous lip 44 and the beveled platform 43 are seamlessly connected to tubular frame sidewalls 27, 28, 29, and 30. The beveled platform 43 has a top surface 45 and bottom surface 46. The top surface 45 diverges from the horizontal towards the center of the beveled platform 43. The beveled platform's 43 angle of inclination from the horizontal to the center of the platform is about 0.5° (degrees) to about 10° (degrees). The center of the beveled platform 43 has a drain aperture 47 traversing the top surface 45 and the bottom surface 46. An elongated drain tube 48, FIG. 2 is connected to the drain aperture 47 providing drainage of the condensation generated by means for ambient climate control unit 14. The beveled platform 43 in combination with the tubular frame sidewalls 27, 28, 29, and 30 form a frame structural enclosure sized to receive means for ambient climate control unit 14.

A vessel retaining member 49, FIG. 1 is coaxially spaced about the drain tube 48. The vessel retaining member 49 has one end mounted to the platform 33. The other end vessel retaining member 49 is structurally supported to the housing frame 11 by support members 70, 71, 72, and 73, FIG. 2. The vessel retaining member 49 is sized to receive the condensation container 15. The vessel retaining member 49 has one side releasably secured to enable entry and exit of the condensation container 15.

The vessel retaining member 49 comprises an elongated U-shaped member 51. The U-shaped member 51 is a pair of elongated, outwardly extending, and spaced apart parallel legs. Each leg has one end angled to form a 90° (degree) bend portion with its respective leg portion. The bend portions of each leg are seamlessly joined together thereby forming the U-shaped member 51. An elongated L-shaped member 52 is formed from a pair of outwardly extending legs, each leg having one end connected to the other leg at a 90° (degree) angle thereby forming the L-shaped member 52. The L-shaped member 52 has one end connected to the bend portion of the U-shaped member 51. The other end of the L-shaped member 52 and the other ends of the U-shaped member 51 are connected together by a substantially rectangular member 53. The rectangular member 53 has one slidable and insertable member 54, FIG. 2 that is detachable from the other three sides of the rectangular member 53. The detachable, slidable and insertable member 54 is releasably secured to the other three sides of the vessel retaining member 49. The detachable slidable and insertable member 54 is substantially rectangular with a first slot 67 adjacently spaced from one end. The other end of the detachable sidable and insertable member 54 has a second slot 86 adjacently spaced from that end. The first and second slots 67 and 68 respectively slide-ably mate with the rectangular member 53 thereby forming the fourth side of the rectangular member 53. A chain 69 has one end connected to the rectangular member 53 and the other end of the chain is connected to the detachable sidable and insertable member 54 thereby retaining the detachable sidable and insertable member 54 to the rectangular member 53.

Figure 3:
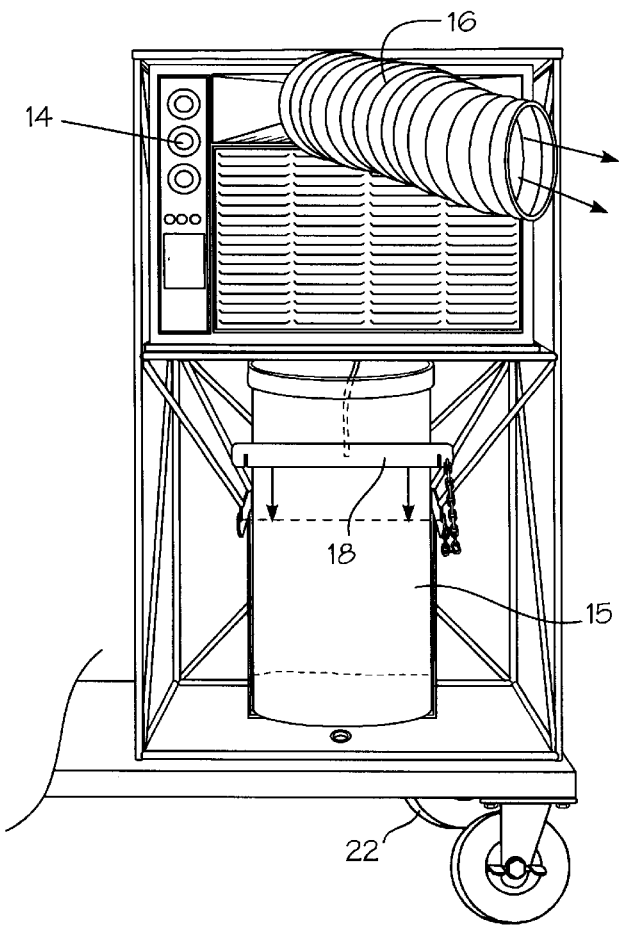
FIG. 3 illustrates a side view schematic diagram of an ambient climate control unit installed within the confines of the present invention of FIG. 2.

The above-discussed housing frame 11, FIG. 2 containing the installed means for ambient climate control unit 14 is mounted in an upright position at one end of the mobile platform 12. The power generator 13 is adjacently spaced to the housing frame 11 at the other end of the mobile platform 12. If desired, a retractable electrical grounding connector 55 may be mounted on platform 12. The electrical grounding connector 55 electrically connects the present invention 10 to any work-piece receiving the benefits of the present invention 10. Means for ambient climate control unit 14, FIG. 3 is electrically connected to the power generator 13.

Figure 4A:
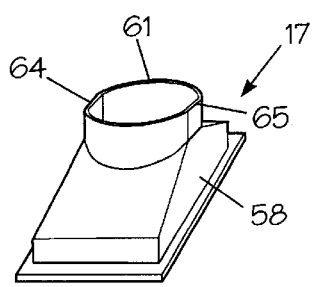
FIG. 4a illustrates a perspective view schematic diagram of the ambient climate control duct adapter of FIG. 3.
Figure 4B:
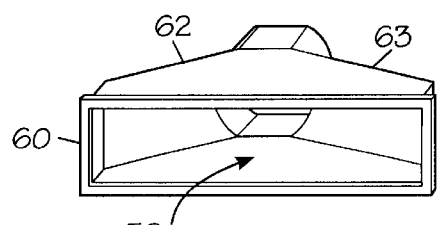
FIG. 4b illustrates an end view schematic diagram of the ambient climate control duct adapter of FIG. 4a, FIG. 5 illustrates a side view schematic diagram of the present invention providing mobile ambient climate control to an aircraft.

The substantially rectangular air duct adapter 17, FIG. 4a comprises a substantially rectangular housing 58. The rectangular housing 58 has one of its long sides 59, FIG. 4b open. A flange 60 is perpendicularly mounted about the open side 59. An elongated hollow substantially cylindrical member 61 is open at both ends. The cylindrical member 61 is mounted to the rectangular housing 58 in an aligned and oppositely spaced position from the rectangular housing's 58 open side 59. The open ends of the cylindrical member 61 and the rectangular housing 58 form an air passage through the associated members. Two of the rectangular housing's 58 sidewalls 62 and 63 adjoining the cylindrical member 61 slope towards and adjoin the flange 60. The rectangular housing's 58 other two sidewalls are parallel and extend from the juncture of the flange and the rectangular opening towards the hollow cylindrical member's 61 first opening. The sloping sidewalls 62 and 63 seamlessly join to the parallel sidewalls about the hollow cylindrical member's 61 first opening. The rectangular housing's 58 sidewalls form an interior passageway from the rectangular opening 59 to the cylindrical member's 61 opening. The cylindrical member's 61 sidewalls have a pair of oppositely spaced apart flat portions 64 and 65 extending along the longitudinal length of the cylindrical member 61. The flat portions 64 and 65 are aligned with the rectangular housing's 58 parallel sidewalls. The flat portions 64 and 65 enable the air-conditioner duct adapter 17 to be connected to the air-conditioner duct 16 by any convenient means.

Figure 5:
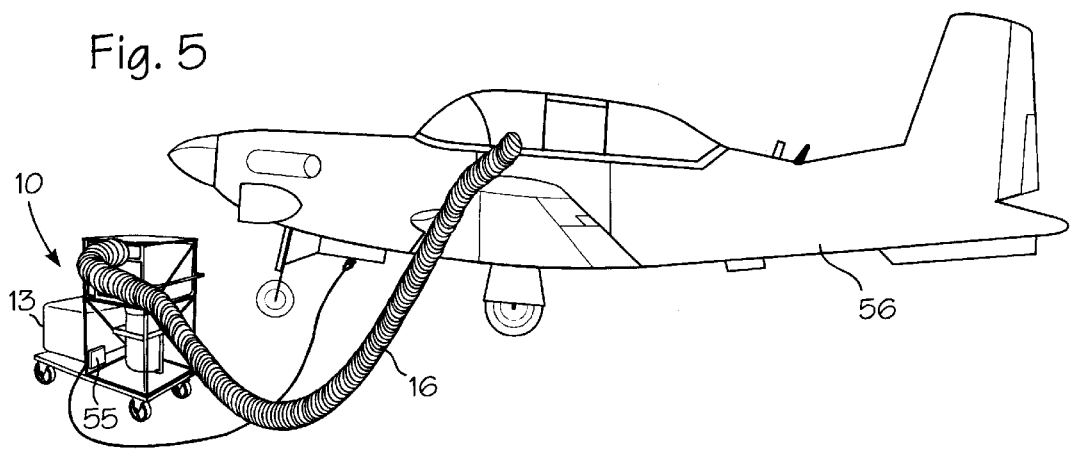

In operation, the present invention 10, FIG. 5 is positioned adjacent the aircraft 56. The present invention is connected to the aircraft 56 via air-conditioner duct 16. The retractable electrical grounding connector 55 is connected to any convenient metal portion of the aircraft 56. The electrical or gasoline generator 13 provides the power to the present invention 10 containing means for ambient climate control unit 14. The mobility of the present invention 10 enables heating or cooling to be provided to the aircraft 56 during routine service while on the flight line or in an aircraft hanger.

Although only a few exemplary embodiments of this invention have been described in detail above, those skilled in the art will readily appreciate that many modifications are possible in the exemplary embodiments without materially departing from the novel, teachings and advantages of this invention. Accordingly, all such modifications are intended to be included within the scope of this invention as defined in the following claim, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A mobile apparatus containing means for ambient climate control, means for ambient climate control having disposed thereto an attachable air duct, the mobile apparatus having mountably disposed thereon an electric power source and a condensation vessel, the mobile apparatus comprising:
   a) a substantially rectangular mobile platform having a top surface and a bottom surface;
   b) a substantially rectangular tubular frame mountably disposed at one end of said mobile platform's top surface in an upright position, said tubular frame having a top portion and a bottom portion;
   c) a substantially rectangularly shaped beveled platform being mountably disposed between said tubular frame's top and bottom portions, said beveled platform having a drain aperture disposed therein;
   d) said beveled platform and said tubular frame's top portion forming in combination a tubular framed structural enclosure, said tubular framed structural enclosure sized to receive means for ambient climate control;
   e) a vessel retaining member mountably disposed to said tubular frame's bottom portion, said vessel retaining member coaxially spaced about said drain aperture, said vessel retaining member sized to receive the condensation container;
   whereby said mobile platform in concert with said tubular frame containing means for ambient climate control enable mobile ambient climate control and containment of the condensation generated from means for ambient climate control.

2. An apparatus as recited in claim 1, further comprising an air duct adapter connectively disposed between the air duct and means for ambient climate control.

3. An apparatus as recited in claim 1 wherein said beveled platform's angle of inclination from the horizontal to the center of said beveled platform is about 0.5° (degrees) to about 10° (degrees).

4. An apparatus as recited in claim 3, further comprising an elongated drain tube, said drain tube mountably disposed to said beveled platform's drain aperture, said drain tube extending outwardly from said beveled platform.

5. An apparatus as recited in claim 4, said vessel retaining member, comprises:
   a) an elongated U-shaped member, said U-shaped member having a pair of elongated, outwardly extending, and spaced apart parallel legs, said pair of legs both having one end angled to form a 90° (degree) bend portion with their respective leg portions, said bend portions of both said pair of legs seamlessly joined together thereby forming said U-shaped member;
   b) an elongated L-shaped member, said L-shaped member having a pair of outwardly extending legs, each said leg having one end connected to the other leg at a 90° (degree) angle thereby forming the L-shaped member;
   c) said L-shaped member connectively disposed to said U-shaped member;
   d) a substantially rectangular member, oppositely spaced from the union of said U-shaped member and said L-shaped member, being connectively disposed thereto;
   e) said rectangular member having one side member sidably insertably into the other three side members thereby forming said substantially rectangular member; and
   f) said side member detachably disposed to the other three side members.

6. An apparatus as recited in claim 1 further comprising a retractable electrical grounding mechanism, said retractable electrical grounding mechanism mountably disposed to said mobile platform.

7. An apparatus as recited in claim 2 wherein said air duct adapter comprises:
   a) a substantially rectangular housing having one of its long sides open;
   b) a flange perpendicularly mounted about said rectangular housing's open end;
   c) an elongated hollow substantially cylindrical member open at both ends, said cylindrical member's first open end aligned with said rectangular member's open side;
   d) said rectangular housing having two sidewalls sloping from said flange to said cylindrical member's first open end, said rectangular housing member's other two sidewalls are spaced apart, parallel, and extend from said flange to said cylindrical member's first open end, said sloping sidewalls seamlessly join to said parallel sidewalls about the cylindrical member's first open end, said cylindrical member and said rectangular housing's open side forming a continuous air passageway; and
   e) said cylindrical member's sidewalls having a pair of oppositely spaced apart flat portions extending along the longitudinal length of said cylindrical member, said flat portions aligning and joining to said rectangular housing's parallel sidewalls.

8. An apparatus having mountably disposed thereon a power generator, condensation vessel, and means for ambient climate control via an attachable air duct, the apparatus comprising:
   a) a tubular frame forming an elongated rectangular housing, said housing having four elongated tubular frame sidewalls and two foreshortened tubular frame walls, said two foreshortened tubular sidewalls oppositely spaced apart, parallel, and connectively disposed to each end of said elongated tubular frame sidewalls;
   b) a first substantially rectangular plate mountably disposed to one end of said rectangular housing;
   c) a second substantially rectangular plate mountably disposed to the other end of said rectangular housing;
   d) a substantially rectangularly shaped beveled platform having a lip continuously surrounding its perimeter, said beveled platform spaced between said first and said second rectangular plates, said beveled platform mountably disposed to said rectangular housing's frame sidewalls via said continuous lip, said beveled platform having a drain aperture disposed therein;
   e) an elongated drain tube, said drain tube mountably disposed to said beveled platform's drain aperture, said drain tube extending outwardly from said beveled platform;
   f) said beveled platform having top and bottom surfaces, said top surface diverging from the horizontal towards said bottom surface causing said top surface to slope towards it center;
   g) said beveled platform and said housing frame forming in combination a framed structural enclosure, said frame structural container sized to receive means for ambient climate control;
   h) a substantially rectangular mobile platform having a top surface and a bottom surface;
   i) a plurality of ground engaging wheels mountably disposed to said platform's bottom surface;
   j) a locking mechanism connectively disposed to each said ground engaging wheel;
   k) said rectangular housing being disposed in an upright position at one end of said mobile platform's top surface;
   l) said mobile platform's other end having mountably disposed thereto the power generator;
   m) a vessel retaining member mountably disposed between said beveled platform and one end of said rectangular housing's foreshortened tubular sidewall adjacent to said mobile platform's top surface, said vessel retaining member coaxially spaced about said drain aperture, said vessel retaining member sized to receive the condensation container;
   whereby said mobile platform having disposed thereon said housing containing means for ambient climate control with power being provided by the power generator, and said vessel retaining member retaining the condensation vessel thereby providing mobile ambient climate control and containment of condensation generated from means for ambient climate control.

9. A method for structural containment of a power generator, condensation vessel, and means for ambient climate control via an attachable air duct, the method comprising the steps of:
   a) providing a substantially rectangular mobile platform;
   b) constructing a tubular frame forming an elongated rectangular housing;
   c) constructing a substantially rectangularly shaped beveled platform having a lip continuously circumnavigating its perimeter, said beveled platform medially spaced between said housing's two foreshortened ends;
   d) mounting said housing in an upright position at one end of said mobile platform adjacently spaced from the power generator;

e) forming in combination from said beveled platform and said housing frame a framed structural enclosure, said frame structural container sized to receive means for ambient climate control;

f) draining the condensation generated by means for ambient climate control via an elongated drain tube mountably disposed to said beveled platform's provided drain aperture, said drain tube extending outwardly from said beveled platform; and g) retaining the condensation vessel via a vessel retaining member mountably disposed between said beveled platform and one end of said housing's foreshortened tubular sidewall, said vessel retaining member coaxially spaced about said drain aperture, said vessel retaining member sized to receive the condensation container.

10. A mobile apparatus containing means for ambient climate control, means for ambient climate control having disposed thereto an attachable air duct, the mobile apparatus having mountably disposed thereon an electric power source and a condensation vessel, the mobile apparatus comprising:

a) a substantially rectangular mobile platform having a top surface and a bottom surface;

b) a substantially rectangular tubular frame mountably disposed at one end of said mobile platform's top surface in an upright position, said tubular frame having a top portion and a bottom portion;

c) a first plurality of tubular cross-braces angularly disposed to said tubular frame's top portion, said first plurality of tubular cross-braces forming a first lateral support structure bracing said tubular frame's top portion;

d) a second plurality of tubular cross-braces angularly disposed to said tubular frame's bottom portion, said second plurality of tubular cross-braces forming a second lateral support structure bracing said tubular frame's bottom portion;

e) a substantially rectangularly shaped beveled platform being mountably disposed between said tubular frame's top and bottom portions, said beveled platform having a drain aperture disposed therein;

f) said beveled platform and said tubular frame's top portion forming in combination a tubular framed structural enclosure, said tubular framed structural enclosure sized to receive means for ambient climate control;

g) a vessel retaining member mountably disposed to said tubular frame's bottom portion, said vessel retaining member coaxially spaced about said drain aperture, said vessel retaining member sized to receive the condensation container;

whereby said mobile platform in concert with said tubular frame containing means for ambient climate control enable mobile ambient climate control and containment of the condensation generated from means for ambient climate control.

* * * * *